US012120535B2

United States Patent
Chen et al.

(10) Patent No.: US 12,120,535 B2
(45) Date of Patent: Oct. 15, 2024

(54) NETWORK DEVICE AND METHOD EXECUTED BY THE NETWORK DEVICE AND COMPUTER-READABLE MEDIUM

(71) Applicant: ARRIS Enterprises LLC, Suwanee, GA (US)

(72) Inventors: Lidan Chen, Guangdong (CN); Ruilu Zeng, Guangdong (CN); Ju Li, Guangdong (CN); Bo Chen, Guangdong (CN); Yu Zhang, Guangdong (CN); Kurt A Lumbatis, Dacula, GA (US)

(73) Assignee: RUCKUS IP HOLDINGS LLC, Claremont, NC (US)

( * ) Notice: Subject to any disclaimer, the term of this patent is extended or adjusted under 35 U.S.C. 154(b) by 416 days.

(21) Appl. No.: 17/510,687

(22) Filed: Oct. 26, 2021

(65) Prior Publication Data

US 2022/0201511 A1   Jun. 23, 2022

(30) Foreign Application Priority Data

Dec. 23, 2020  (CN) .................. 202011542490.X

(51) Int. Cl.
*H04W 72/08* (2009.01)
*H04J 3/24* (2006.01)
(Continued)

(52) U.S. Cl.
CPC ............ *H04W 24/04* (2013.01); *H04W 8/005* (2013.01); *H04W 24/10* (2013.01); *H04W 84/12* (2013.01)

(58) Field of Classification Search
CPC ..... H04W 24/04; H04W 24/10; H04W 48/08; H04W 72/085; H04W 72/542;
(Continued)

(56) References Cited

U.S. PATENT DOCUMENTS 7,756,082 B1 * 7/2010 Dhamdhere ...... H04W 36/0085
455/436
8,537,733 B1 * 9/2013 Panneerselvam ..........................
H04W 52/0235
370/311

(Continued)

OTHER PUBLICATIONS

International Search Report and the Written Opinion of the International Searching Authority dated Feb. 14, 2022 in International (PCT) Application No. PCT/US2021/056551.

(Continued)

*Primary Examiner* — Edan Orgad
*Assistant Examiner* — Vanneilian Lalchinthang
(74) *Attorney, Agent, or Firm* — Wenderoth, Lind & Ponack, L.L.P.

(57) ABSTRACT

The present disclosure relates to a network device, a method executed by the network device, and a computer-readable medium. Some aspects of the present disclosure relate to a first network device, including a memory, on which instructions are stored, and a processor configured to execute the instructions stored on the memory to cause the first network device to execute the following operations: executing channel scanning on a main working channel of a second network device coupled to the first network device to detect a beacon frame broadcast by the second network device; determining whether a beacon frame broadcast by the second network device is detected within a first predetermined time duration; and at least partially in response to the determination that no beacon frame broadcast by the second network device has been detected within the first predetermined time duration, causing the second network device to automatically restart its Wi-Fi module.

20 Claims, 7 Drawing Sheets

(51) Int. Cl.
*H04L 12/24* (2006.01)
*H04W 8/00* (2009.01)
*H04W 24/04* (2009.01)
*H04W 24/10* (2009.01)
*H04W 84/12* (2009.01)

(58) Field of Classification Search
CPC ..... H04W 48/10; H04W 48/16; H04W 8/005; H04W 24/00; H04W 16/26; H04W 84/12; H04L 12/28; H04L 43/04; H04L 41/0654; H04L 41/0677
USPC .......................................................... 370/252
See application file for complete search history.

(56) References Cited

U.S. PATENT DOCUMENTS

| | | | | |
|---|---|---|---|---|
| 9,949,146 | B1* | 4/2018 | Velusamy | H04W 8/082 |
| 2005/0020262 | A1* | 1/2005 | Kim | H04W 24/04 |
| | | | | 455/435.1 |
| 2007/0104139 | A1* | 5/2007 | Marinier | H04W 84/20 |
| | | | | 370/329 |
| 2011/0261797 | A1* | 10/2011 | Yamaguchi | H04W 72/51 |
| | | | | 370/338 |
| 2016/0295598 | A1* | 10/2016 | Chen | H04W 52/14 |
| 2017/0171791 | A1* | 6/2017 | Li | H04W 36/06 |
| 2018/0139086 | A1* | 5/2018 | Chakraborty | H04L 43/0823 |
| 2021/0281800 | A1* | 9/2021 | Singh | H04L 65/65 |
| 2022/0303180 | A1* | 9/2022 | Qu | H04L 41/0853 |
| 2023/0076833 | A1* | 3/2023 | Yukawa | H04W 72/0453 |
| 2023/0300561 | A1* | 9/2023 | Trippe-Smith | G06Q 10/0833 |
| | | | | 455/456.1 |

OTHER PUBLICATIONS

International Preliminary Report on Patentability and Written Opinion issued Jul. 6, 2023 in International Application No. PCT/US2021/056551.

* cited by examiner

200

S201: executing channel scanning on the main working channel of the second network device coupled to the first network device to detect a beacon frame broadcast by the second network device S203: determining whether a beacon frame broadcast by the second network device is detected within the first predetermined time duration S205: at least partially in response to the determination that no beacon frame broadcast by the second network device is detected within the first predetermined time duration, causing the second network device to automatically restart its Wi-Fi module

Fig. 2

NETWORK DEVICE AND METHOD EXECUTED BY THE NETWORK DEVICE AND COMPUTER-READABLE MEDIUM

TECHNICAL FIELD

The present application relates to network technology in general, and more specifically relates to the monitoring of the broadcast of beacon frames of network devices.

BACKGROUND ART

In a relatively large house or office, a single access point (AP) is usually not enough to provide network coverage for the entire house or office. Generally, one or more extenders (or referred to as small access points) are connected to a main access point (main AP) connected to the Wide Area Network (WAN) to form a grid network covering the entire house or office.

Under normal circumstances, an access point will continuously broadcast beacon frames, and clients such as mobile phones can only discover and connect to the access point after receiving the beacon frames. If the access point does not broadcast beacon frames for some reasons, clients that have been connected to the access point before may not be affected; however, new clients cannot discover the access point because they cannot receive beacon frames. As a result, the new clients cannot connect to the network via the access point.

SUMMARY OF THE INVENTION

According to a first aspect of the present disclosure, a first network device is disclosed, including a memory, on which instructions are stored, and a processor configured to execute the instructions stored on the memory to cause the first network device to carry out the following operations: executing channel scanning on a main working channel of a second network device coupled to the first network device to detect a beacon frame broadcast by the second network device; determining whether a beacon frame broadcast by the second network device is detected within a first predetermined time duration; and at least partially in response to the determination that no beacon frame broadcast by the second network device is detected within the first predetermined time duration, causing the second network device to automatically restart its Wi-Fi module.

According to some embodiments, the processor is further configured to execute the instructions stored on the memory to cause the first network device to carry out the following operations to execute channel scanning on the main working channel of the second network device coupled to the first network device to detect a beacon frame broadcast by the second network device: determining whether a main working channel of the first network device is the same as the main working channel of the second network device; in response to the determination that the main working channel of the first network device is the same as the main working channel of the second network device, executing the channel scanning on the main working channel of the first network device; and in response to the determination that the main working channel of the first network device is different from the main working channel of the second network device, tuning a radio device of the first network device to the main working channel of the second network device to execute the channel scanning.

According to some embodiments, the first predetermined time duration is greater than an interval at which the second network device broadcasts the beacon frame.

According to some embodiments, the processor is further configured to execute the instructions stored on the memory to cause the first network device to execute the following operations: after determining that no beacon frame broadcast by the second network device is detected within the first predetermined time duration, determining whether a running service volume on the second network device is less than a first restart threshold; in response to the determination that the running service volume on the second network device is less than the first restart threshold, causing the second network device to automatically restart its Wi-Fi module.

According to some embodiments, the processor is further configured to execute the instructions stored on the memory to cause the first network device to execute the following operation: acquiring information of the main working channel of the second network device.

According to some embodiments, the main working channel information of the second network device is reported to the first network device by the second network device in response to a channel change at the second network device and is stored at the first network device.

According to some embodiments, the processor is further configured to execute the instructions stored on the memory to cause the first network device to execute the following operation to cause the second network device to automatically restart its Wi-Fi module: sending a command of automatically restarting the Wi-Fi module to the second network device.

According to some embodiments, the processor is further configured to execute the instructions stored on the memory to cause the first network device to execute the following operation to cause the second network device to automatically restart its Wi-Fi module: in response to the determination that no beacon frame broadcast by the second network device is detected within the first predetermined time duration, reporting a determination result to the second network device to cause the second network device to restart the Wi-Fi module based at least in part on the determination result.

According to some embodiments, the processor is further configured to execute the instructions stored on the memory to cause the first network device to execute the following operation: sending the main working channel information of the first network device to the second network device.

According to some embodiments, the processor is further configured to execute the instructions stored on the memory to cause the first network device to execute the following operation: receiving a command of automatically restarting the Wi-Fi module of the first network device from the second network device.

According to some embodiments, the processor is further configured to execute the instructions stored on the memory to cause the first network device to execute the following operations: receiving a monitoring result from the second network device, the monitoring result indicating that the second network device has not detected a beacon frame broadcast by the first network device on the main working channel of the first network device within a second predetermined time duration; and automatically restarting the Wi-Fi module of the first network device at least based on the monitoring result, wherein the second predetermined time duration is greater than an interval at which the first network device broadcasts the beacon frame.

According to some embodiments, the processor is further configured to execute the instructions stored on the memory to cause the first network device to execute the following operations to automatically restart the Wi-Fi module of the first network device at least based on the monitoring result: determining whether a running service volume on the first network device is less than a second restart threshold; and in response to the determination that the running service volume on the first network device is less than the second restart threshold, automatically restarting the Wi-Fi module of the first network device.

According to some embodiments, the first network device is a main access point connected to WAN, the second network device is a first hop extender coupled to the main access point, and the first hop extender is coupled to at least one second hop extender, wherein, the processor is further configured to execute the instructions stored on the memory to cause the first network device to execute the following operations: sending a beacon request to the first hop extender; receiving a beacon report from the first hop extender, and the beacon report contains information of all the second hop extenders detected by the first hop extender; determining whether the received beacon report contains a Basic Service Set Identifier (BSSID) of a second hop extender; at least partially in response to the determination that the received beacon report does not contain the BSSID of the second hop extender, instructing the first hop extender to cause the second hop extender to automatically restart its Wi-Fi module.

According to some embodiments, the processor is further configured to execute the instructions stored on the memory to cause the first network device to execute the following operations: after determining that the received beacon report does not contain the BSSID of the second hop extender, determining whether a running service volume on the second hop extender is less than a third restart threshold; in response to the determination that the running service volume on the second hop extender is less than the third restart threshold, instructing the first hop extender to cause the second hop extender to automatically restart its Wi-Fi module.

According to another aspect of the present disclosure, a method is provided, the method including: performing the following operations by a first network device: executing channel scanning on a main working channel of a second network device coupled to the first network device to detect a beacon frame broadcast by the second network device; determining whether a beacon frame broadcast by the second network device is detected within a first predetermined time duration; and at least partially in response to the determination that no beacon frame broadcast by the second network device is detected within the first predetermined time duration, causing the second network device to automatically restart its Wi-Fi module.

According to some embodiments, the step of executing channel scanning on the main working channel of the second network device coupled to the first network device to detect a beacon frame broadcast by the second network device further includes: determining whether a main working channel of the first network device is the same as the main working channel of the second network device; in response to the determination that the main working channel of the first network device is the same as the main working channel of the second network device, executing the channel scanning on the main working channel of the first network device; and in response to the determination that the main working channel of the first network device is different from the main working channel of the second network device, tuning a radio device of the first network device to the main working channel of the second network device to execute the channel scanning.

According to some embodiments, the first predetermined time duration is greater than an interval at which the second network device broadcasts the beacon frame.

According to some embodiments, the method further includes: after determining that no beacon frame broadcast by the second network device is detected within the first predetermined time duration, determining whether a running service volume on the second network device is less than a first restart threshold; in response to the determination that the running service volume on the second network device is less than the first restart threshold, causing the second network device to automatically restart its Wi-Fi module.

According to some embodiments, the method further includes: acquiring information of the main working channel of the second network device.

According to some embodiments, the main working channel information of the second network device is reported to the first network device by the second network device in response to a channel change at the second network device and is stored at the first network device.

According to some embodiments, the step of causing the second network device to automatically restart its Wi-Fi module further includes: sending a command of automatically restarting the Wi-Fi module to the second network device.

According to some embodiments, the step of causing the second network device to automatically restart its Wi-Fi module further includes: in response to the determination that no beacon frame broadcast by the second network device is detected within the first predetermined time duration, reporting a determination result to the second network device to cause the second network device to restart the Wi-Fi module based at least in part on the determination result.

According to some embodiments, the method further includes: sending the main working channel information of the first network device to the second network device.

According to some embodiments, the method further includes: receiving a command of automatically restarting the Wi-Fi module of the first network device from the second network device.

According to some embodiments, the method further includes: receiving a monitoring result from the second network device, the monitoring result indicating that the second network device has not detected a beacon frame broadcast by the first network device on the main working channel of the first network device within a second predetermined time duration; and automatically restarting the Wi-Fi module of the first network device at least based on the monitoring result, wherein the second predetermined time duration is greater than an interval at which the first network device broadcasts the beacon frame.

According to some embodiments, the step of automatically restarting the Wi-Fi module of the first network device at least based on the monitoring result further includes: determining whether a running service volume on the first network device is less than a second restart threshold; and in response to the determination that the running service volume on the first network device is less than the second restart threshold, automatically restarting the Wi-Fi module of the first network device.

According to some embodiments, the first network device is a main access point connected to WAN, the second network device is a first hop extender coupled to the main access point, and the first hop extender is coupled to at least one second hop extender, wherein, the method further includes: sending a beacon request to the first hop extender; receiving a beacon report from the first hop extender, and the beacon report contains information of all the second hop extenders detected by the first hop extender; determining whether the received beacon report contains a Basic Service Set Identifier (BSSID) of a second hop extender; and at least partially in response to the determination that the received beacon report does not contain the BSSID of the second hop extender, instructing the first hop extender to cause the second hop extender to automatically restart its Wi-Fi module.

According to some embodiments, the method further includes: after determining that the received beacon report does not contain the BSSID of the second hop extender, determining whether a running service volume on the second hop extender is less than a third restart threshold; and in response to the determination that the running service volume on the second hop extender is less than the third restart threshold, instructing the first hop extender to cause the second hop extender to automatically restart its Wi-Fi module.

According to another aspect of the present disclosure, a non-transitory computer-readable medium having computer instructions stored thereon is provided, and the computer instructions cause, when executed by a processor of a network device in a network system, the network device to execute the operations of the method described above.

According to another aspect of the present disclosure, a computer program product is provided, the computer program comprising computer instructions that, when executed by a processor of a network device in a network system, cause the network device to execute the operations of the method described above.

BRIEF DESCRIPTION OF THE ATTACHED DRAWINGS

For a better understanding of the present disclosure and to show how to realize the present disclosure, examples are herein described with reference to the attached drawings, wherein:

FIG. 2 is a schematic flow chart of a method executed by a network device according to some other embodiments of the present disclosure.

It should be noted that throughout the attached drawings, similar reference numerals and signs refer to corresponding parts. In addition, multiple instances of the same part are designated by a common prefix separated from the instance number by a dash.

SPECIFIC EMBODIMENTS

The following detailed description is made with reference to the attached drawings, and the following detailed description is provided to facilitate comprehensive understanding of various exemplary embodiments of the present disclosure. The following description includes various details for facilitation of understanding. However, these details are merely considered as examples, not for limiting the present disclosure. The present disclosure is subject to the attached claims and their equivalents. The words and phrases used in the following description are only used to enable a clear and consistent understanding of the present disclosure. In addition, for clarity and brevity, descriptions of well-known structures, functions, and configurations may be omitted. Those of ordinary skill in the art will realize that various changes and modifications can be made to the examples described in the present specification without departing from the gist and scope of the present disclosure.

The present disclosure relates to a network device and a method executed by the network device. In the embodiments of the present disclosure, the network devices provide users with more stable network connections by monitoring whether each other's beacon frames are broadcast normally, and in the case of abnormal beacon frame broadcasting, causing an abnormal network device to automatically restart its Wi-Fi module.

Figure 1:
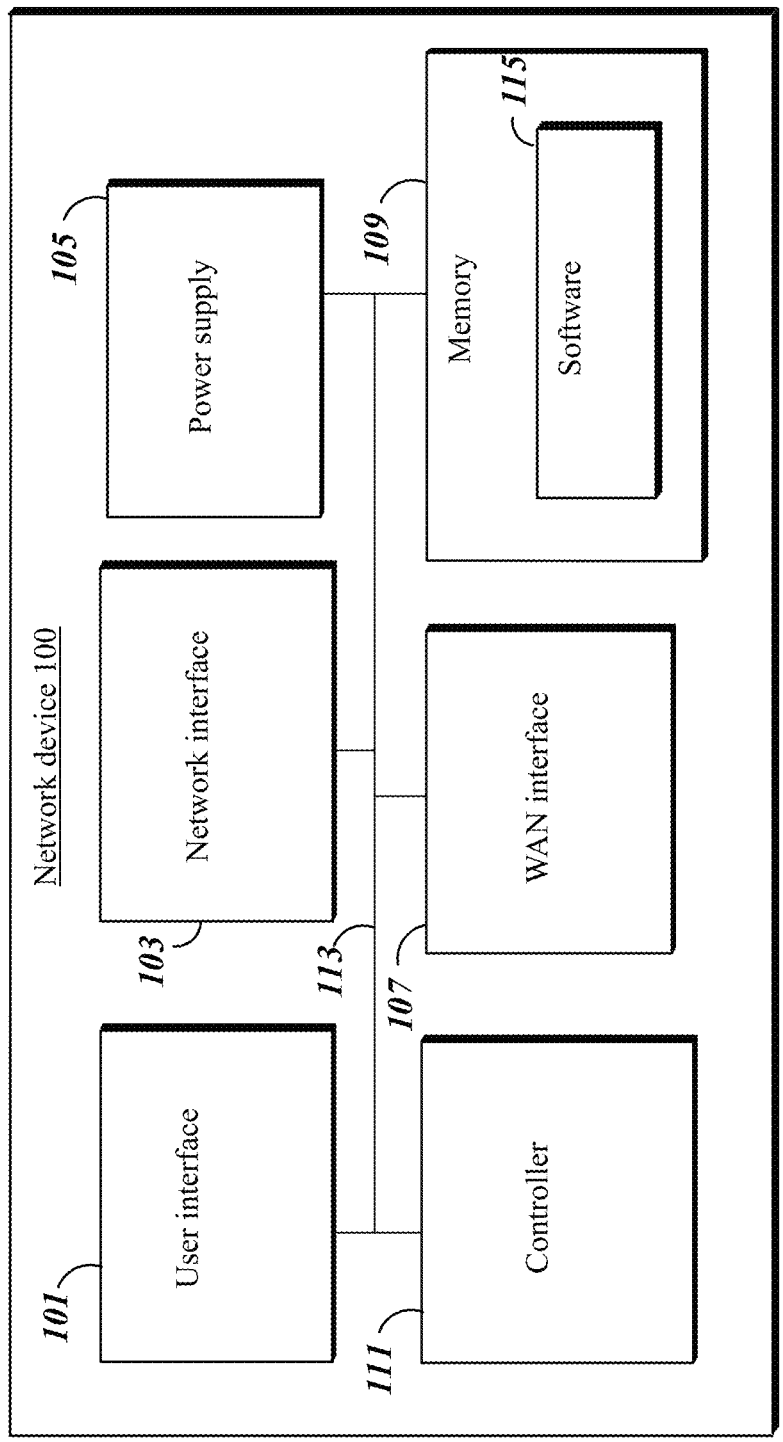
FIG. 1 is a block diagram of an exemplary configuration of a network device according to some embodiments of the present disclosure.

FIG. 1 is a block diagram showing an exemplary configuration of a network device 100 according to an embodiment of the present disclosure.

The network device 100 may be, for example, a hardware network device capable of combining one or more of functions of a modem, an access point, a gateway, and/or a router. The present disclosure further proposes that the network device 100 may include, but is not limited to, functions of an IP/QAM set top box (STB) or a smart media device (SMD), and the IP/QAM set top box or the smart media device can decode audio/video contents and play contents provided by OTT (Over The Top) or a multiple systems operator (MSO).

As shown in FIG. 1, the network device 100 includes a user interface 101, a network interface 103, a power supply 105, a WAN interface 107, a memory 109, and a controller 111.

The user interface 101 may include, but is not limited to, a button, a keyboard, a keypad, LCD, CRT, TFT, LED, HD or other similar display devices, including a display device with a touch screen capability that enables interaction between a user and a gateway device. The user interface 101 may include a speaker for acoustic output. The user interface 101 may further include various indicator lights. The indicator light may be an LED indicator light.

The network interface 103 may comprise various types of network cards and circuit systems realized by software and/or hardware so as to be able to communicate with a wireless extender and a client device using a wireless protocol. The wireless protocol is, for example, any IEEE 802.11 Wi-Fi protocol, Bluetooth protocol, Bluetooth Low Energy (BLE) or other short-distance protocols operated in accordance with wireless technology standards, and is used to use any licensed or unlicensed frequency band (for example, the Citizens Broadband Radio Service (CBRS) band, 2.4 GHz band, 5 GHz band, or 6 GHz band), RF4CE protocol, ZigBee protocol, Z-Wave protocol, or IEEE 802.15.4 protocol to exchange data over a short distance.

The power supply 105 provides power to internal components of the network device 100 via the internal controller 111. The power supply 105 may be a self-contained power source such as a battery pack, the interface of which is powered by (for example, directly or through other devices) a charger connected to a wall socket. The power supply 105 may further include a rechargeable battery that is detachable for replacement, for example, NiCd, NiMH, Li-ion, or Li-pol battery.

The WAN interface 107 may include various network cards and circuit systems realized by software and/or hardware so as to achieve communication between a router and an Internet service provider or a multi-system operator.

The memory 109 includes a single memory or one or more memories or storage locations, including but not limited to a random access memory (RAM), a dynamic random access memory (DRAM), a static random access memory (SRAM), a read-only memory (ROM), EPROM, EEPROM, a flash memory, FPGA logic block, a hard disk, or any other layers of a memory hierarchy. The memory 109 may be used to store any type of instructions, software or algorithms, including software 115 for controlling general functions and operations of the network device 100.

The controller 111 controls the general operations of the network device 100 and executes the administrative functions related to other devices (for example, extenders and client devices) in the network. The controller 111 may comprise, but is not limited to, a CPU, hardware microprocessor, hardware processor, multi-core processor, single-core processor, microcontroller, application specific integrated circuit (ASIC), DSP, or other similar processing devices, and is able to execute any type of instructions, algorithms, or software for controlling the operations and functions of the network device 100 according to the embodiments described in the present disclosure. The controller 111 may be various types of realizations of digital circuit systems, analog circuit systems, or mixed signal (a combination of analog and digital signals) circuit systems executing functions in a computer system. The controller 111 may comprise, for example, an integrated circuit (IC), a portion or circuit of a separate processor core, an entire processor core, a separate processor, a programmable hardware device, such as a field programmable gate array (FPGA), and/or a system comprising a plurality of processors.

An internal bus 113 may be used to establish communication between the components (for example, 101, 103, 105, 107, 109, and 111) of the network device 100.

The network device integrates a Wi-Fi access function. A Wi-Fi station can establish a Wi-Fi link with the network device.

The Wi-Fi station may include, but is not limited to: a desktop computer, a laptop computer, a notebook/netbook, a computer, a tablet, a smart phone, a cell phone, a smart watch, a wearable device, a consumer electronic device, a portable computing device, a test device, and/or other electronic device.

The network device may include, but is not limited to, a router, a Wi-Fi Access Point, a cable modem, a gateway, an extender, or any other electronic device that integrates a Wi-Fi access function.

The network device can support various Wi-Fi frequency bands, including but not limited to 2.4G, 5G, etc.

FIG. 2 is a schematic flow chart showing a method 200 executed by a network device according to an embodiment of the present disclosure.

As shown in FIG. 2, the method 200 includes a step S201. In this step, a first network device executes channel scanning on a main working channel of a second network device coupled to the first network device to detect a beacon frame broadcast by the second network device.

In the present disclosure, the main working channel of the network device may refer to a channel on which the Wi-Fi module of the network device is current working.

For example, if the network device is working on channel 36 of the 5G Wi-Fi frequency band, its main working channel is channel 36. If the network device is working on channel 6 of the 2.4G Wi-Fi frequency band, its main working channel is channel 6.

Network devices that support multiple Wi-Fi frequency bands can have multiple main working channels. For example, if a network device supports both the 2.4G Wi-Fi frequency band and the 5G Wi-Fi frequency band, its main working channel may include the main working channel on the 5G frequency band and the main working channel on the 2.4G frequency band. In some embodiments, the first network device and the second network device may both support the 2.4G Wi-Fi frequency band, or both support the 5G Wi-Fi frequency band, or both support the 2.4G Wi-Fi frequency band and the 5G Wi-Fi frequency band.

The method 200 further includes a step S203. In this step, the first network device determines whether a beacon frame broadcast by the second network device is detected within a first predetermined time duration.

The first predetermined time duration is at least greater than an interval at which the second network device broadcasts the beacon frame. For example, assuming that the second network device broadcasts a beacon frame every 100 milliseconds, the first predetermined time duration may be set to be longer than 100 milliseconds, such as 30 seconds.

In some embodiments, the first predetermined time duration may span a plurality of beacon frame broadcast intervals. Within the first predetermined time duration, the first network device may execute multiple times of channel scanning on the main working channel of the second network device at a predetermined frequency, and determine whether a beacon frame broadcast by the second network device is detected within the first predetermined time duration based on the results of multiple channel scans.

The method 200 further includes a step S205. In this step, the first network device causes the second network device to automatically restart its Wi-Fi module at least partially in response to the determination that no beacon frame broadcast by the second network device is detected within the first predetermined time duration.

In some embodiments, the first network device may, in response to the determination that no beacon frame broadcast by the second network device is detected within the first predetermined time duration, cause the second network device to automatically restart its Wi-Fi module.

In some other embodiments, the first network device may, in response to the determination that no beacon frame broadcast by the second network device is detected within the first predetermined time duration and in consideration of the current service volume on the second network device, determine whether to cause the second network device to automatically restart its Wi-Fi module.

In some embodiments, the first network device is a main AP connected to a wide area network, and the second network device is an extender coupled to the main AP. In some other embodiments, the second network device is a main AP connected to the wide area network, and the first network device is an extender coupled to the main AP.

In some embodiments, the first network device may be a first hop extender connected to a main AP, and the second network device may be a second hop extender coupled to the first hop extender. In some other embodiments, the second network device is a first hop extender connected to a main AP, and the first network device is a second hop extender coupled to the first hop extender.

In some embodiments, the first network device and the second network device may be two successive hop extenders.

Figure 3:
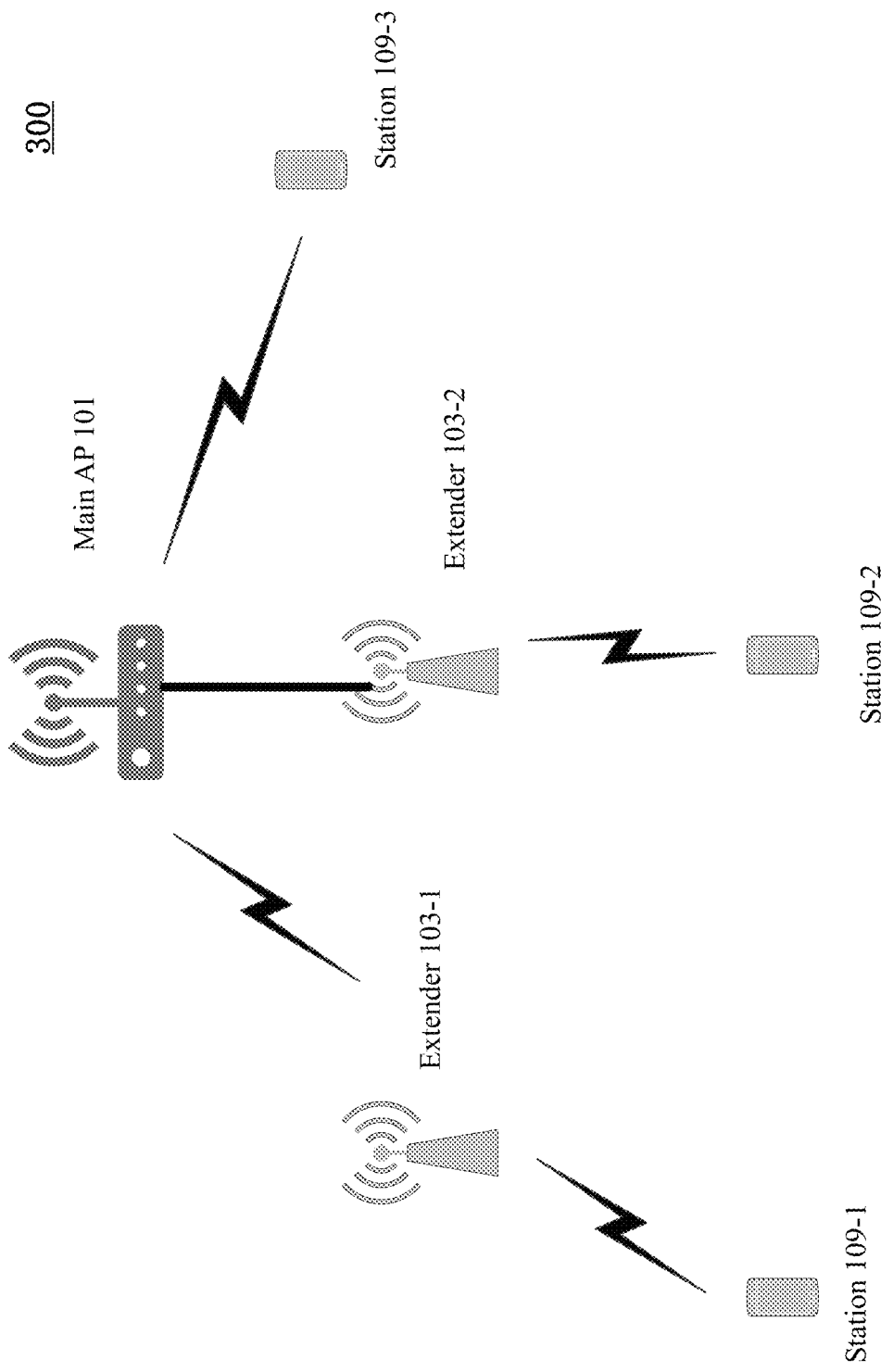
FIG. 3 is a schematic diagram of a network system according to some embodiments of the present disclosure.

FIG. 3 is a schematic diagram of a network system 300 according to an embodiment of the present disclosure.

As shown in FIG. 3, the network system 300 includes a main AP 101 connected to the wide area network. The network system 300 further includes two extenders 103-1 and 103-2. The main AP 101 is in wireless connection to the extender 103-1 via, for example, a 2.4G or 5G Wi-Fi link, and is in wired connection to the extender 103-2 via, for example, an Ethernet connection or a MoCA (Multimedia over Coax Alliance) connection. The network system 300 further includes Wi-Fi stations 109-1, 109-2, and 109-3, wherein the station 109-1 is connected to the extender 103-1, the station 109-2 is connected to the extender 103-2, and the station 109-3 is connected to the main AP 101.

Those skilled in the art can understand that there can be more or fewer extenders and Wi-Fi stations.

Under normal circumstances, the main AP 101, the extenders 103-1 and 103-2 will continuously broadcast beacon frames in order to allow Wi-Fi stations within their respective coverage areas to discover them.

Here, for the main AP 101, the extender 103-1 and the station 109-3 are the Wi-Fi stations within the coverage area of the main AP 101. For the extender 103-1, the main AP 101 and the station 109-1 are the Wi-Fi stations within the coverage area of the extender 103-1. For the extender 103-2, the main AP 101 and the station 109-2 are the Wi-Fi stations within the coverage area of the extender 103-2. It is assumed here that the extender 103-1 and the extender 103-2 are not within the coverage area of each other.

If any one of the network devices such as the main AP 101, the extenders 103-1 and 103-2 has a beacon frame broadcast abnormality for some reasons, such as stopping broadcasting the beacon frame, generally devices that have been connected to the network device before will not be affected. However, new devices that want to connect to the network device cannot discover the network device because they cannot receive beacon frames. As a result, the new devices cannot access the network by connecting to the network device.

The present disclosure conceives that these network devices monitor each other's beacon frame broadcast state, and this will be described in detail below.

Figure 4:
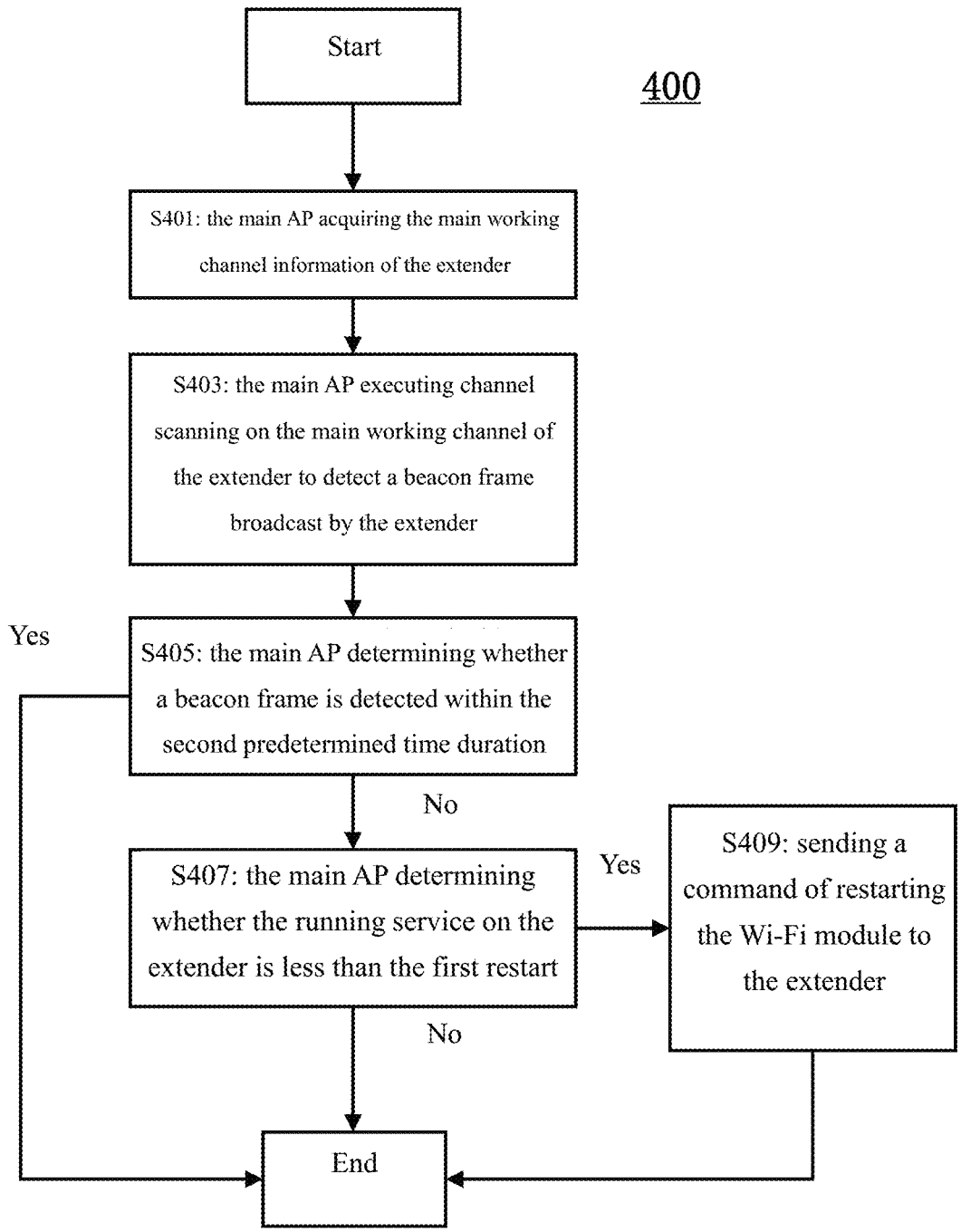
FIG. 4 is a schematic flow chart of a method executed by a main AP in FIG. 3 according to some other embodiments of the present disclosure.

FIG. 4 is a schematic flow chart of a method 400 executed by the main AP 101 in FIG. 3 according to some embodiments of the present disclosure.

The method 400 relates to monitoring by the main AP 101 the beacon frame broadcast state of each extender within its coverage area. Those skilled in the art can understand that the main AP can execute the steps of the method 400 with respect to each extender within its coverage area.

As shown in the figure, the method 400 includes a step S401. In this step, the main AP acquires the information of a main working channel of an extender.

Taking the extender 103-1 as an example, the main AP 101 may acquire the main working channel information of the extender 103-1.

In some embodiments, the extender 103-1 may actively report its latest main working channel information to the main AP 101 in response to any channel change that occurs at the extender. The channel change may occur during the bootup of the extender or during dynamic channel selection in the working process of the extender.

The main AP 101 receives the main working channel information reported by the extender 103-1 and stores it in a memory. Upon receiving the updated main working channel information reported by the extender 103-1, the main AP 101 may replace the previous main working channel information with the updated main working channel information. The main AP 101 may acquire the latest main working channel information of the extender 103-1 from the memory.

In some embodiments, the main AP 101 may also send a request to the extender 103-1, and the extender 103-1 reports its current main working channel information to the main AP 101 in response to the request.

The main working channel information of the extender may indicate the main working channel of the extender. For example, assume that the extender is working on channel 36 of the 5G frequency band. Then, the main working channel information of the extender may indicate the channel 36 of the 5G frequency band.

As shown in the figure, the method 400 further includes a step S403. In this step, the main AP executes channel scanning on the main working channel of the extender to detect a beacon frame broadcast by the extender.

The main AP may determine whether the main working channel of the main AP is the same as the main working channel of the extender based on the acquired main working channel information of the extender.

Taking the extender 103-1 in FIG. 3 as an example, in the case of a 5G Wi-Fi connection between the main AP 101 and the extender 103-1, usually, the main working channel of the main AP 101 is the same as the main working channel of the extender 103-1, for example, both working on the channel 36 of 5G.

In this case, the main AP 101 can determine that the main working channel of the main AP is the same as the main working channel of the extender, and the main AP 101 executes channel scanning on the same main working channel, that is, the main working channel of the main AP 101, to detect a beacon frame broadcast by the extender 103-1.

In some cases, the main working channel of the main AP may be different from the main working channel of the extender.

For example, taking the extender 103-2 in FIG. 3 as an example, the extender 103-2 and the main AP 101 are in a wired connection, and the main working channel of the extender 103-2 may be different from the main working channel of the main AP 101. For example, the main AP 101 may work on the channel 36 of 5G, and the extender 103-2 may work on channel 149 of 5G.

In this case, the main AP 101 can determine that the main working channel of the main AP is different from the main working channel of the extender 103-2, and the main AP 101 needs to tune a radio device to a frequency corresponding to channel 40 of 5G to carry out the channel scanning to monitor the beacon frames broadcast by the extender 103-2. Those skilled in the art may set an amount of time for the main AP 101 to tune to the main working channel of the extender for scanning, that is, the length of time from leaving its own main working channel to returning to its own main working channel.

Channel scanning may be carried out only for the 20M bandwidth of the main working channel, and does not have to be carried out on other working channels.

As shown in the figure, the method 400 further includes a step S405. In this step, the main AP determines whether a beacon frame is detected within a second predetermined time duration.

Taking the extender 103-1 as an example, the main AP determines whether a beacon frame broadcast by the extender 103-1 is detected within the second predetermined time duration.

Those skilled in the art may set the length of the second predetermined time duration according to actual needs. The second predetermined time duration may be set to be longer than an interval at which the extender broadcasts the beacon frame. A different second predetermined time duration may be set for each extender. The second predetermined time duration may span a plurality of beacon frame broadcast intervals. Multiple times of channel scanning may be executed at a set frequency within the second predetermined time duration. The main AP may determine whether a beacon frame broadcast by the extender is detected within the second predetermined time duration based on the results of multiple channel scans.

If the main AP determines in step S405 that the beacon frame broadcast by the extender is detected within the second predetermined time duration, it indicates that the beacon frame broadcast state of the extender is normal, and the method 400 ends.

If the main AP determines in step S405 that no beacon frame broadcast by the extender is detected within the second predetermined time duration, it indicates that the beacon frame broadcast state of the extender is abnormal, and the method 400 proceeds to step S407.

In step S407, the main AP determines whether a running service volume on the extender is less than a first restart threshold.

The running service volume on the extender may be expressed as data rate of transmission currently occurring on the extender. The first restart threshold may be a preset data rate.

When the main AP determines in step S411 that the running service volume on the extender is less than the first restart threshold, this means that restarting the Wi-Fi module of the extender may have little impact on the stations previously connected to the extender, and the method 400 proceeds to step S409. In this step, the main AP sends a command of restarting the Wi-Fi module to the extender to cause the extender to automatically restart its own Wi-Fi module. Specifically, the extender may automatically restart its own Wi-Fi module upon receiving the command of restarting the Wi-Fi module.

When the main AP determines in step S407 that the running service volume on the extender is not less than the first restart threshold, this means that restarting the Wi-Fi module of the extender may have relatively a great impact on the stations previously connected to the extender. The main AP does not send a command of restarting the Wi-Fi module to the extender, and the method 400 ends.

Those skilled in the art can understand that the method 400 and its variations may be periodically executed at the main AP according to a preset frequency or time interval (for example, executed several times per minute, or once every several minutes).

In the method in FIG. 4, when the main AP determines that no beacon frame broadcast by the extender is detected within the second predetermined time duration, the main AP determines whether the running service volume on the extender is less than the first restart threshold. Those skilled in the art can understand that in some variations, the main AP may directly send a monitoring result, that is, the result that no beacon frame broadcast by the extender is detected within the second predetermined time duration, to the extender. The extender may, in response to receiving the monitoring result, determine whether the running service volume on the extender is less than the first restart threshold. If the extender determines that the running service volume thereon is less than the first restart threshold, it automatically restarts the Wi-Fi module. If the extender determines that the running service volume thereon is not less than the first restart threshold, it may not take any action.

In this case, the main AP may only monitor the beacon frame broadcast state of the extender and report the monitoring result, and the extender decides whether to restart its Wi-Fi module according to the monitoring result and the volume of the running services.

Figure 5:
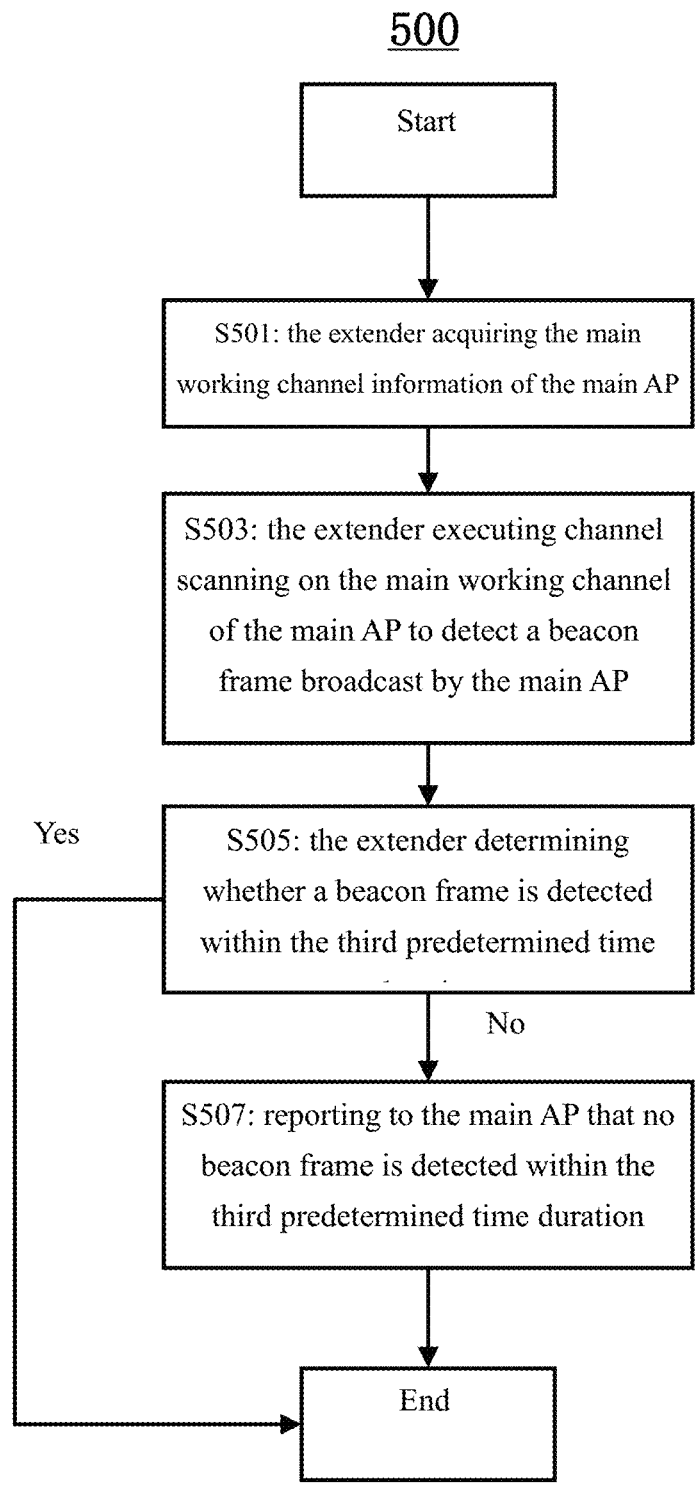
FIG. 5 is a schematic flow chart of a method executed by an extender in FIG. 3 according to some other embodiments of the present disclosure.

FIG. 5 is a schematic flow chart of a method 500 executed by the extender (for example, the extender 103-1 or 103-2) in FIG. 3 according to some embodiments of the present disclosure.

The method 500 relates to monitoring the beacon frame broadcast state of the main AP 101 by a selected extender. For example, further referring to FIG. 3, the main AP 101 may be within the wireless coverage area of a plurality of extenders connected to the main AP 101. The main AP 101 can select an extender for monitoring according to certain rules. For example, the main AP 101 may select an extender with the maximum received signal strength indication (RSSI) according to the signal strength of the wireless link between each extender and the main AP 101. For another example, an extender with the lowest service priority may be selected according to the main service type of each extender.

As shown in FIG. 5, the method 500 starts from step S501, and in this step, the extender acquires the information of the main working channel of the main AP.

Assume that the main AP 101 selects the extender 103-1 as the extender for monitoring. After selecting the extender 103-1 as the extender for monitoring, the main AP 101 sends its current main working channel information to the extender 103-1. The extender 103-1 receives the main working channel information sent by the main AP 101 and stores it in its memory.

In some embodiments, the main AP 101 may actively report its latest main working channel information to the extender 103-1 in response to any channel change that occurs at the main AP. The channel change may occur during the bootup of the main AP or during dynamic channel selection in the working process of the main AP.

Upon receiving the updated main working channel information from the main AP, the extender 103-1 may replace the previous main working channel information with the updated main working channel information. The extender 103-1 may acquire the latest main working channel information of the main AP 101 from the memory.

In some embodiments, the extender 103-1 may also send a request to the main AP 101, and the main AP reports its current main working channel information to the extender 103-1 in response to the request.

Next, the method 500 proceeds to step S503. In this step, the extender executes channel scanning on the main working channel of the main AP to detect a beacon frame broadcast by the main AP.

Similar to step S403, the extender may also determine whether the main working channel of the extender is the same as the main working channel of the main AP based on the acquired main working channel information of the main AP.

Taking the extender 103-1, which is an extender for monitoring, as an example, in the case of a 5G Wi-Fi connection between the extender 103-1 and the main AP 101, usually, the main working channel of the extender 103-1 is the same as the main working channel of the main AP 101, for example, both working on the channel 36 of 5G.

In this case, the extender 103-1 can determine that the main working channel of the extender is the same as the main working channel of the main AP, and the extender 103-1 executes channel scanning on the same main working channel, that is, the main working channel of the extender 103-1, to detect a beacon frame broadcast by the main AP 101.

In some cases, the main working channel of the extender may be different from the main working channel of the main AP.

For example, taking the extender 103-2 in FIG. 3, which is selected as an extender for monitoring, as an example, the extender 103-2 and the main AP 101 are in a wired connection, and the main working channel of the extender 103-2 may be different from the main working channel of the main AP 101. For example, the main AP 101 may work on the channel 36 of 5G, and the extender 103-2 may work on the channel 149 of 5G.

In this case, the extender 103-2 can determine that the main working channel of the extender is different from the main working channel of the main AP, and the extender 103-2 needs to tune a radio device to a frequency corresponding to the channel 36 of 5G to carry out the channel scanning to monitor the beacon frames broadcast by the main AP 101. Those skilled in the art may set an amount of time for the extender 103-2 to tune to the main working channel of the main AP for scanning, that is, the length of time from leaving its own main working channel to returning to its own main working channel.

As shown in the figure, the method 500 further includes a step S505. In this step, the extender determines whether a beacon frame is detected within a third predetermined time duration.

Taking the extender 103-1 as an example, the extender 103-1 determines whether a beacon frame broadcast by the main AP is detected within the third predetermined time duration.

Those skilled in the art may set the length of the third predetermined time duration according to actual needs. The third predetermined time duration may be set to be longer than an interval at which the main AP broadcasts the beacon frame. The third predetermined time duration may span a plurality of beacon frame broadcast intervals. Multiple times of channel scanning may be executed at a set frequency within the third predetermined time duration. The extender 103-1 may determine whether a beacon frame broadcast by the main AP is detected within the third predetermined time duration based on the results of multiple channel scans.

If the extender determines in step S505 that the beacon frame broadcast by the main AP is detected within the third predetermined time duration, it indicates that the beacon frame broadcast state of the main AP is normal, and the method 500 ends.

If the extender determines in step S505 that no beacon frame broadcast by the main AP is detected within the third predetermined time duration, it indicates that the beacon frame broadcast state of the main AP is abnormal, and the method 500 proceeds to step S507.

In step S507, the extender reports to the main AP that no beacon frame is detected within the third predetermined time duration.

In some embodiments, upon receiving the monitoring result that "no beacon frame is detected within the third predetermined time duration", the main AP may determine whether the running service volume on the main AP is less than a second restart threshold.

The running service volume on the main AP may be expressed as data rate of transmission currently occurring on the main AP. The second restart threshold may be a preset data rate.

When the main AP determines that the running service volume on the main AP is less than the second restart threshold, the main AP automatically restarts the Wi-Fi module of the main AP. When the main AP determines that the running service volume on the main AP is not less than the second restart threshold, the main AP does not take any action, that is, does not automatically restart the Wi-Fi module of the main AP.

In some other embodiments, when the extender determines in step S505 that no beacon frame is detected within the third predetermined time duration, the extender may not report the monitoring result to the main AP, but instead, acquire information about the running service volume on the main AP and determine whether the running service volume on the main AP is less than the second restart threshold. In the case where it is determined that the running service volume on the main AP is less than the second restart threshold, the extender sends a command of restarting the Wi-Fi module of the main AP to the main AP. Otherwise, the extender does not send any report or command to the main AP.

Those skilled in the art can understand that the method 500 and its variations may be periodically executed at the extender according to a preset frequency or time interval (for example, executed several times per minute, or once every several minutes).

It can be seen from the above that any one of the main AP and the extender can either play the role of the monitoring party or play the role of the monitored party. The main AP may monitor the beacon frame broadcast state of the extender, and cause the extender to restart the Wi-Fi module according to actual situations when detecting an abnormality in the beacon frame broadcasting. The extender may also monitor the beacon frame broadcast state of the main AP, and cause the main AP to restart the Wi-Fi module according to actual situations when detecting an abnormality in the beacon frame broadcasting.

Figure 6:
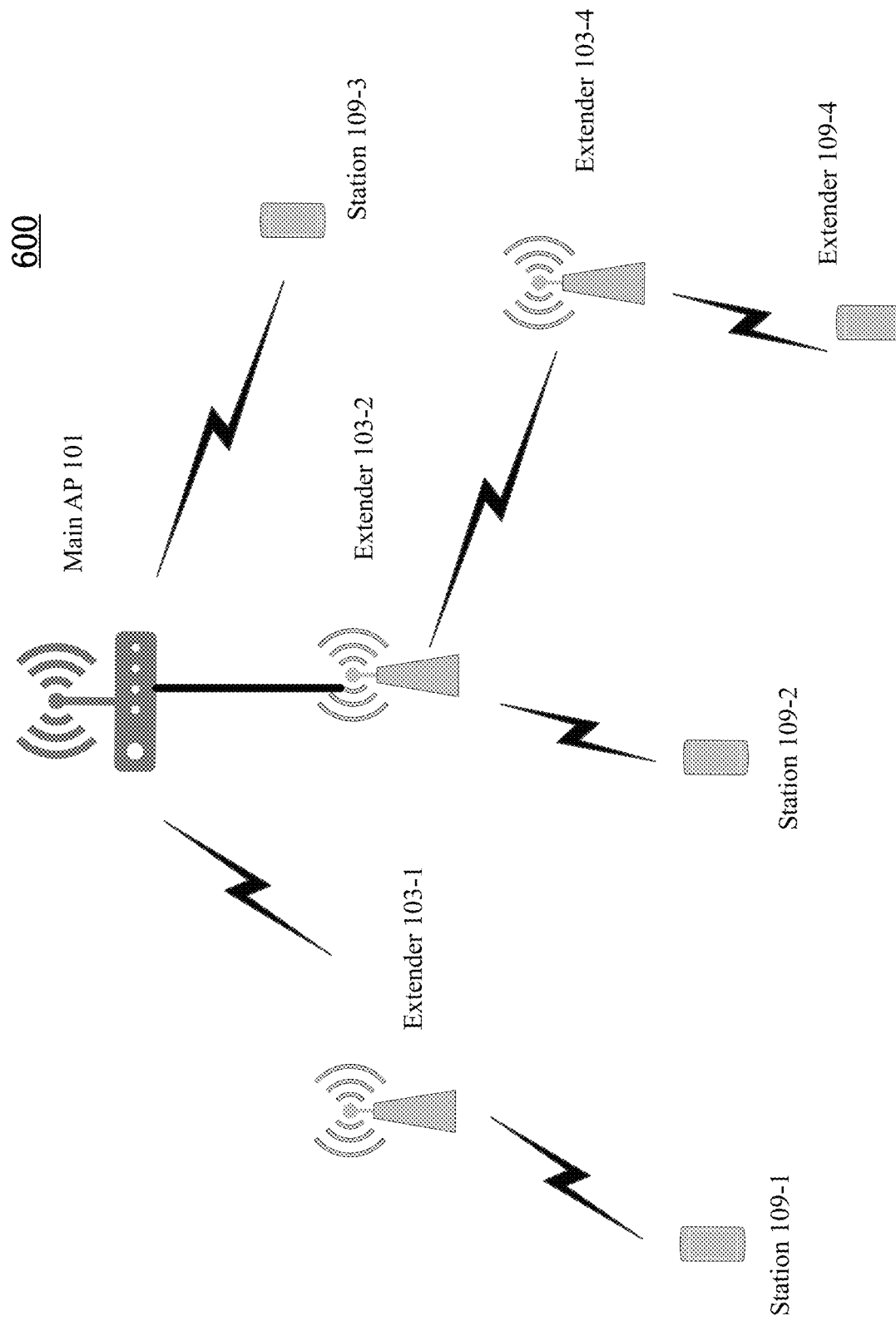
FIG. 6 is a schematic diagram of a network system according to some embodiments of the present disclosure.

FIG. 6 is a schematic diagram of a network system 600 according to an embodiment of the present disclosure.

Comparing with the network system 300 in FIG. 3, the network system 600 further includes, in addition to the extenders 103-1 and 103-2 (hereinafter also referred to as a first hop extender) directly connected to the main AP 101, a second hop extender 103-4 indirectly connected to the main AP 101 via the first hop extender 103-2. The second hop extender 103-4 is in wireless connection to the extender 103-2 and provides network access for a station 109-4 within its coverage area. The second hop extender 103-4 is outside the wireless coverage area of the main AP 101, but is within the wireless coverage area of the first hop extender 103-2. In this case, the main AP 101 cannot directly monitor the beacon frame broadcast state of the second hop extender 103-4.

In some embodiments, the main AP 101 may instruct the first hop extender 103-2 to monitor the beacon frame broadcast state of the second hop extender 103-4 in the way that the main AP 101 monitors the beacon frame broadcast state of the extender 103-2 (for example, similar to FIG. 4), and the second extender 103-4 may also monitor the beacon frame broadcast state of the first hop extender 103-2 in the way that the first hop extender 103-2 monitors the beacon frame broadcast state of the main AP (for example, similar to FIG. 5). The method flow and operations are similar to those described in FIG. 4 and FIG. 5, and will not be repeated here. Those skilled in the art can understand that such method flow can be applied to any two successive hop extenders.

In some other embodiments, the first hop extender 103-2 and the second hop extender 103-4 can support 802.11k. In this case, a beacon request in 802.11k can be used. This will be described in detail with reference to FIG. 7.

Figure 7:
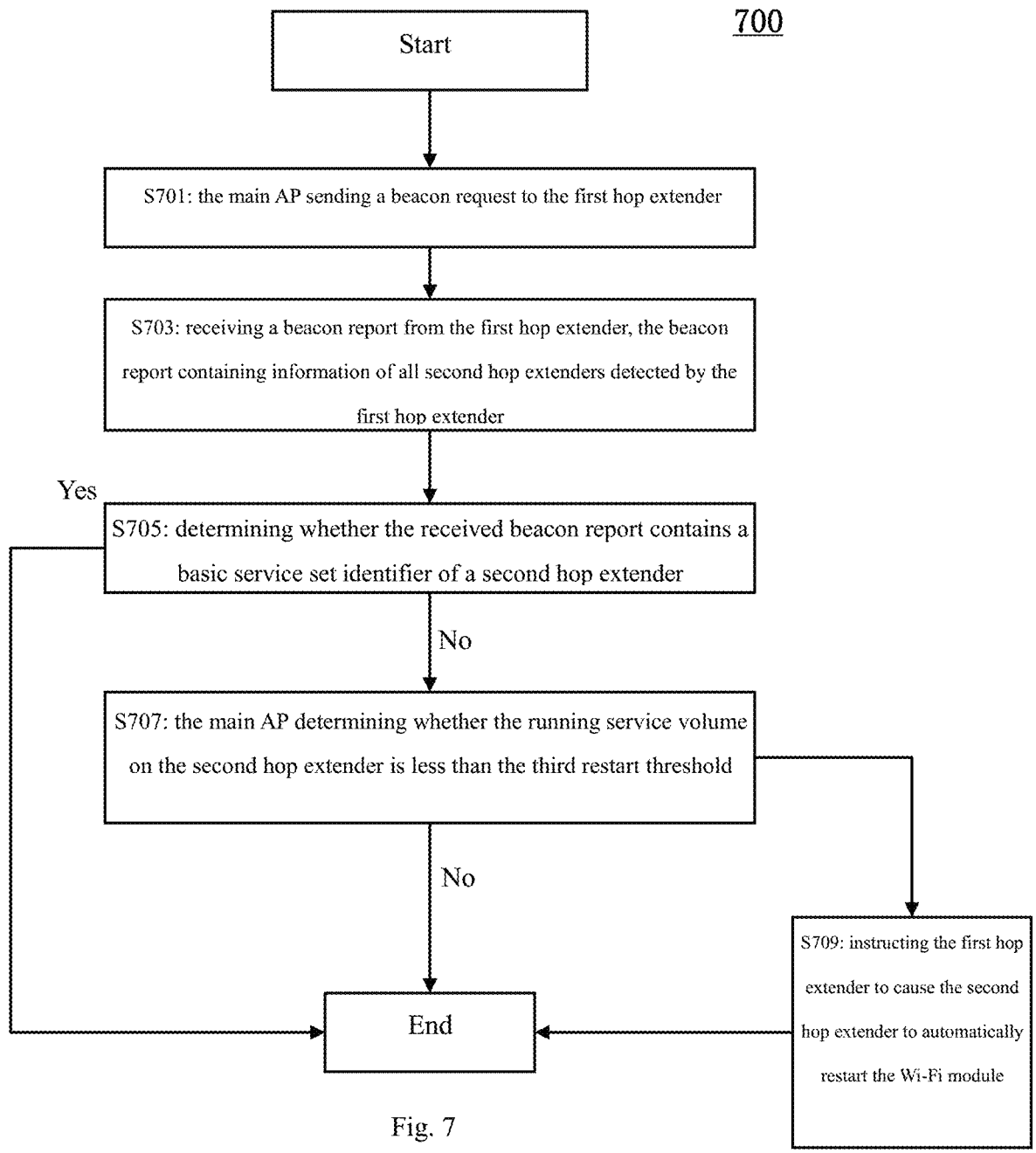
FIG. 7 is a schematic flow chart of a method executed by a network device according to some embodiments of the present disclosure.

FIG. 7 is a schematic flow chart of a method 700 executed by the main AP in FIG. 6 according to some embodiments of the present disclosure.

As shown in the figure, the method 700 includes a step S701, and in this step, the main AP sends a beacon request to the first hop extender.

For example, referring to FIG. 6, the main AP 101 may send a beacon request to the extender 103-2. Upon receiving the beacon request, the extender 103-2 will determine the information of all the next hop extenders within its coverage area and send a beacon report containing the information to the main AP 101.

The method 700 further includes S703. In this step, the main AP receives a beacon report from the first hop extender, and the beacon report contains information of all the second hop extenders detected by the first hop extender. The information contains, for example, the basic service set identifiers of all the second hop extenders.

The method 700 further includes S705. In this step, the main AP determines whether the received beacon report contains the basic service set identifier of a second hop extender.

Assuming that the beacon report sent by the first hop extender 103-2 in FIG. 6 includes information of a plurality of second hop extenders, the main AP 101 determines whether the information of a certain second hop extender, for example, the extender 103-4, more specifically, the basic service set identifier of the extender 103-4, is contained in the received beacon report.

If it is determined in step S707 that the received beacon report contains the basic service set identifier of the extender 103-4, it indicates that the beacon frame broadcast of the extender 103-4 is normal, and the method 700 ends.

If it is determined in step S707 that the received beacon report does not contain the basic service set identifier of the extender 103-4, it indicates that the beacon frame broadcast of the extender 103-4 may be abnormal, and the method 700 proceeds to step S707. In this step, the main AP determines whether the running service volume on the second hop extender is less than a third restart threshold.

If it is determined in step S707 that the running service volume on the second hop extender is less than the third restart threshold, the method 700 proceeds to step S709. In this step, the main AP instructs the first hop extender to cause the second hop extender to automatically restart the Wi-Fi module.

In some embodiments, the main AP sends a command of instructing the second hop extender to automatically restart to the first hop extender, and the first extender sends the command to the second hop extender. The second hop extender may restart its Wi-Fi module based on this command. In some other embodiments, the main AP may also only send the result of whether the beacon report contains the BSSID of the second hop extender to the first hop extender and the second hop extender. Any one of the first hop extender and the second hop extender may further consider the running service volume on the second hop extender to decide whether to restart the Wi-Fi module of the second hop extender.

Those skilled in the art may, based on the teachings of the present disclosure, conceive various modifications, and these modifications are all within the protection scope of the present disclosure.

If it is determined in step S707 that the running service volume on the second hop extender is not less than the third restart threshold, the main AP does not take any action, that is, does not instruct the first hop extender to cause the second hop extender to automatically restart the Wi-Fi module, and the method 700 ends.

Those skilled in the art can understand that the method 700 and its variations may be periodically executed at the main AP according to a preset frequency or time interval (for example, executed several times per minute, or once every several minutes).

Those skilled in the art can understand that although FIG. 6 and FIG. 7 are described with respect to a network system including two-hop extenders, the network system may include more hop extenders as long as two successive hop extenders support 802.11k, and the steps of the method shown in FIG. 7 can be used. For example, assuming that the second hop extender 103-4 is further connected to a third hop extender, the main AP may send a beacon request to the second hop extender 103-4 via the first hop extender 103-2, and the second hop extender 103-4 may send a beacon report to the main AP via the first hop extender 103-2, and the beacon report contains, for example, the information of all third hop extender detected by the second hop extender 103-4. If the beacon report does not include the information (such as BSSID) of a certain third hop extender, it indicates that the third hop extender may have a beacon frame broadcast abnormality, and the main AP may further determine whether to cause the third hop extender to restart the Wi-Fi module. This is similar to the method in FIG. 7.

Those skilled in the art may, based on the teachings of the present disclosure, conceive various modifications, and these modifications are all within the protection scope of the present disclosure.

The present disclosure may be realized as any combination of devices, systems, integrated circuits, and computer programs on non-transitory computer-readable media. One or a plurality of processors may be realized as an integrated circuit (IC), an application-specific integrated circuit (ASIC) or a large-scale integrated circuit (LSI), a system LSI, a super LSI, or an ultra LSI component that performs some or all of the functions described in the present disclosure.

According to each step of the method of the present disclosure, it may also be executed respectively by a plurality of components included in the device. According to an embodiment, these components can be realized as computer program modules established to realize various steps of the method, and a device including these components may realize the program module structure of the method by computer programs.

The present disclosure includes the use of software, applications, computer programs, or algorithms. Software, application programs, computer programs or algorithms can be stored on a non-transitory computer-readable medium, so that a computer with one or a plurality of processors can execute the aforementioned steps and the steps described in the attached drawings. For example, one or more memories save software or algorithms via executable instructions, and one or more processors may associate a set of instructions executing the software or algorithms to enhance security in any number of wireless networks according to the embodiments described in the present disclosure.

Software and computer programs (also called programs, software applications, applications, components, or codes) include machine instructions for programmable processors, and may be realized in high-level procedural languages, object-oriented programming languages, functional programming languages, logic programming languages, or assembly languages or machine languages. The term "computer-readable medium" refers to any computer program product, apparatus or device used to provide machine instructions or data to the programmable data processor, e.g., magnetic disks, optical disks, solid-state storage devices, memories, and programmable logic devices (PLDs), including computer-readable media that receive machine instructions as computer-readable signals.

For example, the computer-readable medium may include the dynamic random access memory (DRAM), random access memory (RAM), read only memory (ROM), electrically erasable read only memory (EEPROM), compact disk read only memory (CD-ROM) or other optical disk storage devices, magnetic disk storage devices or other magnetic storage devices, or any other medium that can be used to carry or store the required computer-readable program codes in the form of instructions or data structures and can be accessed by a general or special computer or a general or special processor. As used herein, magnetic disks or disks include compact discs (CDs), laser disks, optical disks, digital versatile discs (DVDs), floppy disks, and Blu-ray disks, wherein magnetic disks usually copy data magnetically, and disks copy data optically via laser. Combinations of the above are also included in the scope of computer-readable media.

In one or a plurality of embodiments, the use of the words "able", "can", "operable as" or "configured as" refers to some devices, logics, hardware and/or components designed to be used in a specified manner. The subject matter of the present disclosure is provided as an example of the apparatus, system, method, and program for performing the features described in the present disclosure. However, in addition to the aforementioned features, other features or modifications can be expected. It can be expected that any emerging technology that may replace any of the aforementioned realized technologies may be used to complete the realization of the components and functions of the present disclosure.

In addition, the above description provides examples without limiting the scope, applicability, or configuration set forth in the claims. Without departing from the spirit and scope of the present disclosure, changes may be made to the functions and layouts of the discussed components. Various embodiments may omit, substitute, or add various processes or components as appropriate. For example, features described with respect to some embodiments may be combined in other embodiments.

Similarly, although operations are depicted in a specific order in the attached drawings, this should not be understood as a requirement that such operations should be executed in the specific order shown or in the sequential order, or that all illustrated operations be executed to achieve the desired result. In some cases, multi-tasking and parallel processing can be advantageous.

The invention claimed is:

1. A first network device, including:
a memory, on which instructions are stored; and
a processor, configured to execute the instructions stored on the memory to cause the first network device to perform one or more operations comprising:
  executing channel scanning on a first main working channel of a second network device coupled to the first network device to detect a first beacon frame broadcast by the second network device;
  determining that the first beacon frame is detected within a first predetermined time duration;
  causing the second network device to automatically restart a first Wi-Fi module of the second network device based on the determination;
  receiving a beacon report from the second network device, wherein the second network device is coupled to at least one second hop extender of one or more second hop extenders; and
  in response to determining, based on the beacon report not containing a basic service set identifier (BSSID), that a running service volume on the at least one second hop extender is less than a third restart threshold, instructing the second network device to cause the at least one second hop extender to automatically restart a third Wi-Fi module of the at least one second hop extender.

2. The first network device according to claim 1, wherein the executing channel scanning comprises:
determining whether a second main working channel of the first network device is the same as the first main working channel;
in response to the determination that the second main working channel is the same as the first main working channel, executing the channel scanning on the second main working channel; and
in response to the determination that the second main working channel is different from the first main working channel, tuning a radio device of the first network device to the first main working channel to execute the channel scanning.

3. The first network device according to claim 1, wherein the first predetermined time duration is greater than an interval at which the second network device broadcasts the first beacon frame.

4. The first network device according to claim 1, wherein the processor is further configured to execute the instructions stored on the memory to cause the first network device to perform the one or more operations further comprising:
after determining that no beacon frame broadcast by the second network device is detected within the first predetermined time duration, determining whether a first running service volume on the second network device is less than a first restart threshold, and in response to the determination that the first running service volume is less than the first restart threshold, causing the second network device to automatically restart the first Wi-Fi module;

acquiring first information of the first main working channel;

sending a second information of the second main working channel to the second network device; or receiving a command of automatically restarting a second Wi-Fi module of the first network device from the second network device.

5. The first network device according to claim 1, wherein the processor is further configured to execute the instructions stored on the memory to cause the first network device to perform the one or more operations further comprising:

in response to a channel change, sending a second information of the second main working channel to the second network device.

6. The first network device according to claim 1, wherein causing the second network device to automatically restart the first Wi-Fi module comprises:

sending a command of automatically restarting the first Wi-Fi module to the second network device; or in response to the determination that no beacon frame broadcast by the second network device is detected within the first predetermined time duration, reporting a determination result to the second network device to cause the second network device to restart the first Wi-Fi module based at least in part on the determination result.

7. The first network device according to claim 1, wherein the processor is further configured to execute the instructions stored on the memory to cause the first network device to perform the one or more operations further comprising:

receiving a monitoring result from the second network device, the monitoring result indicating that the second network device has not detected a second beacon frame broadcast by the first network device on the second main working channel within a second predetermined time duration; and automatically restarting a second Wi-Fi module of the first network device at least based on the monitoring result, wherein the second predetermined time duration is greater than an interval at which the first network device broadcasts the second beacon frame.

8. The first network device according to claim 7, wherein the automatically restarting the second Wi-Fi module comprises:

determining whether a running service volume on the first network device is less than a second restart threshold; and in response to the determination that the running service volume on the first network device is less than the second restart threshold, automatically restarting the second Wi-Fi module.

9. The first network device of claim 1, wherein the first network device is a main access point connected to WAN, the second network device is a first hop extender coupled to the main access point, and the first hop extender is coupled to the at least one second hop extender, wherein, the processor is further configured to execute the instructions stored on the memory to cause the first network device to perform the one or more operations further comprising:

sending a beacon request to the first hop extender;

wherein the beacon report is in response to the beacon request; and wherein the beacon report contains information of all the second hop extenders of the one or more second hop extenders detected by the first hop extender.

10. The first network device according to claim 9, wherein the running service volume is expressed as data rate of transmission currently occurring on the at least one second hop extender.

11. A method of a first network device, the method comprising:

executing channel scanning on a first main working channel of a second network device coupled to the first network device to detect a first beacon frame broadcast by the second network device;

determining that the first beacon frame broadcast by the second network device is detected within a first predetermined time duration;

causing the second network device to automatically restart a first Wi-Fi module of the second network device based on the determination;

receiving a beacon report from the second network device, wherein the second network device is coupled to at least one second hop extender of one or more second hop extenders; and in response to determining, based on the beacon report not containing a basic service set identifier (BSSID), that a running service volume on the at least one second hop extender is less than a third restart threshold, instructing the second network device to cause the at least one second hop extender to automatically restart a third Wi-Fi module of the at least one second hop extender.

12. The method according to claim 11, wherein the executing channel scanning comprises:

determining whether a second main working channel of the first network device is the same as the first main working channel;

in response to the determination that the second main working channel is the same as the first main working channel, executing the channel scanning on the second main working channel; and in response to the determination that the second main working channel is different from the first main working channel, tuning a radio device of the first network device to the first main working channel to execute the channel scanning.

13. The method according to claim 11, wherein the first predetermined time duration is greater than an interval at which the second network device broadcasts the first beacon frame.

14. The method according to claim 11, further comprising at least one of:

after determining that no beacon frame broadcast by the second network device is detected within the first predetermined time duration, determining whether a first running service volume on the second network device is less than a first restart threshold, and in response to the determination that the first running service volume is less than the first restart threshold, causing the second network device to automatically restart the first Wi-Fi module;

acquiring first information of the first main working channel;

sending a command of automatically restarting the first Wi-Fi module to the second network device;

sending a second information of the second main working channel to the second network device; or receiving a command of automatically restarting a second Wi-Fi module of the first network device from the second network device.

15. The method according to claim 14, further comprising:
in response to acquiring the first information, reporting the first information to the first network device.

16. The method according to claim 11, wherein causing the second network device to automatically restart the first Wi-Fi module comprises:
in response to the determination that no beacon frame broadcast by the second network device is detected within the first predetermined time duration, reporting a determination result to the second network device to cause the second network device to restart the first Wi-Fi module based at least in part on the determination result.

17. The method according to claim 11, further comprising:
receiving a monitoring result from the second network device, the monitoring result indicating that the second network device has not detected a second beacon frame broadcast by the first network device on the second main working channel within a second predetermined time duration; and
automatically restarting a second Wi-Fi module of the first network device at least based on the monitoring result,
wherein the second predetermined time duration is greater than an interval at which the first network device broadcasts the second beacon frame.

18. The method according to claim 17, wherein the automatically restarting the second Wi-Fi module of comprises:
determining whether a running service volume on the first network device is less than a second restart threshold; and
in response to the determination that the running service volume on the first network device is less than the second restart threshold, automatically restarting the second Wi-Fi module.

19. The method of claim 11, further comprising:
sending a beacon request to the first hop extender;
wherein, the first network device is a main access point connected to WAN, the second network device is a first hop extender coupled to the main access point, and the first hop extender is coupled to the at least one second hop extender;
wherein the beacon report is in response to the beacon request; and
wherein the beacon report contains information of all the second hop extenders of the one or more second hop extenders detected by the first hop extender.

20. The method according to claim 19, further comprising:
the running service volume is expressed as data rate of transmission currently occurring on the at least one second hop extender.

* * * * *